US008707080B1

(12) United States Patent
McLamb

(10) Patent No.: US 8,707,080 B1
(45) Date of Patent: Apr. 22, 2014

(54) SIMPLE CIRCULAR ASYNCHRONOUS CLOCK DOMAIN CROSSING TECHNIQUE FOR DIGITAL DATA

(75) Inventor: Jeffrey T. McLamb, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 380 days.

(21) Appl. No.: 13/181,277

(22) Filed: Jul. 12, 2011

(51) Int. Cl.
*G06F 1/00* (2006.01)
*G06F 1/12* (2006.01)

(52) U.S. Cl.
USPC ............................ 713/501; 713/400; 713/401

(58) Field of Classification Search
USPC ......................................................... 713/501
See application file for complete search history.

(56) References Cited

U.S. PATENT DOCUMENTS

| | | | | |
|---|---|---|---|---|
| 7,058,799 | B2 * | 6/2006 | Johnson | 713/400 |
| 7,180,914 | B2 * | 2/2007 | Walker et al. | 370/505 |
| 7,224,638 | B1 | 5/2007 | Risk et al. | |
| 7,288,973 | B2 * | 10/2007 | Zerbe et al. | 327/144 |
| 7,436,918 | B2 * | 10/2008 | Kost et al. | 375/355 |
| 7,573,770 | B1 * | 8/2009 | Zhang et al. | 365/221 |
| 7,835,393 | B2 * | 11/2010 | Ren et al. | 370/466 |
| 8,132,036 | B2 * | 3/2012 | Pothireddy et al. | 713/400 |
| 8,212,594 | B2 * | 7/2012 | Singhal et al. | 327/144 |
| 8,433,875 | B2 * | 4/2013 | Cortadella et al. | 711/167 |
| 2007/0067594 | A1 * | 3/2007 | Rashid | 711/167 |

OTHER PUBLICATIONS

Altera, "AN 545:Design Guidelines and Timing Closure Techniques for HardCopy ASIC's", Jul. 2010.
Cadence, Clock Domain Crossing, Closing the Loop on Clock Domain Functional Implementation Problems; Dec. 2004.
Sarwary S., et al. "Critical clock-domain-crossing bugs" EDN, Apr. 3, 2008.

* cited by examiner

*Primary Examiner* — Suresh Suryawanshi
(74) *Attorney, Agent, or Firm* — Hamilton, Brook, Smith & Reynolds, P.C.

(57) ABSTRACT

A clock domain crossing technique that uses a circular buffer toggled by clocks from the two domains with output metastability protection. The resulting output is a pair of enable signals that may be used to pass data between the two clock domains. In one embodiment, a set of storage devices is connected in a circular buffer arrangement. A first subset of the storage devices is clocked by a signal from a first clock domain and a second subset of the flip flops is clocked by a signal taken from a second clock domain. Respective output circuits generate enable signals to be used for transferring data between domains. In some implementations, a pulse is stored and registered by at least two of the storage devices in the first domain before being passed to the devices in the second domain. In other embodiments, the output circuits may include a pair of D flip flops, each clocked by a respective one of the first or second domain signals. In specific arrangements, an output flip flop takes its data input from a logical AND of signals output from a flip flop within its associated domain, to ensure that the enable signal is asserted for only a single output clock cycle, and/or a second flip flop uses a logical AND of its input and inverted output states to avoid metastable conditions.

20 Claims, 3 Drawing Sheets

SIMPLE CIRCULAR ASYNCHRONOUS CLOCK DOMAIN CROSSING TECHNIQUE FOR DIGITAL DATA

BACKGROUND OF THE INVENTION

This application relates to data communications, and more particularly to communication of signals between different clock domains.

The increasing complexity of electronic products now often requires a single system, or even a single integrated circuit chip, to have multiple asynchronous clocks and/or clocks with very different clock frequencies. As but one example, it is common for the input/output interfaces that communicate with external devices to be inherently asynchronous from other internal circuits. There is also a trend towards designing some portions of a single chip to run on multiple independent clocks to address the problem of clock skew across a relatively large chip surface area.

These and other considerations have increased the need for asynchronous clock domain crossing techniques. This need has been met in several different ways. One solution is to combine signals in the two domains into one signal that is common to both domains. However, this approach cannot always be accommodated easily.

Another approach uses a handshake mechanism to ensure proper synchronization. In this scheme, both the data and a control signal are sent from a sending clock domain to a receiving clock domain. After synchronizing the control signal, the receiver can then clock the data into a register. The control signal is then sent back to the sender as an acknowledgement. Once the acknowledgement is received, the sender can then send new data. With this approach, the sending clock domain and receiving clock domain must operate at approximately the same frequency for this scheme. Otherwise, latency problems ensue.

Another way to reliably pass information between clock domains is to use a First In First Out (FIFO) memory. In one arrangement, the FIFO can be a dual port memory having one port clocked by the sender and the other port clocked by the receiver. The advantage of using a FIFO is low-latency. But FIFOs tend to be more expensive and take up more room on a chip than other solutions.

BRIEF DESCRIPTION OF THE DRAWINGS

The following text describes example embodiments of the invention. In the accompanying drawings, like reference characters refer to the same parts throughout the different views, and the drawings are not necessarily to scale, with emphasis instead being placed upon illustrating embodiments of the present invention.

DETAILED DESCRIPTION

A description of example embodiments follows.

Figure 1:
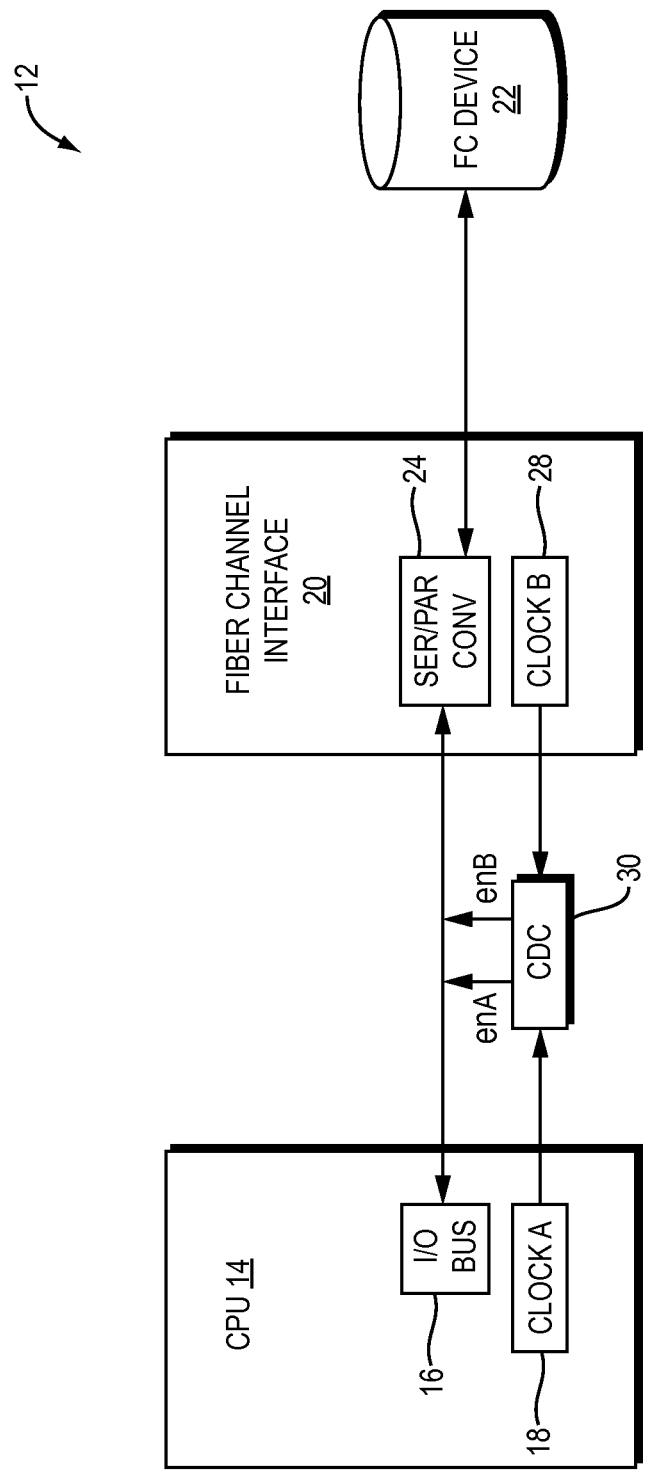
FIG. 1 is a block diagram of an electronic system.

FIG. 1 is a block diagram of an example system where a clock domain crossing apparatus or method has been implemented. It should be understood that clock domain crossing in general can occur wherever data is to be transferred from a circuit driven by one clock to a circuit driven by another clock. Therefore, the system shown in FIG. 1 is but one example where the principles disclosed herein may be applied, and it should be understood that there are many others.

In FIG. 1 an electronic data processing system includes a server 12 having, among other components, a central processing unit (CPU) 14. The CPU 14 has an input/output (I/O) bus 16. The CPU 14 also has an associated clock circuit 18 that generates a first clock signal (clkA) 18 at a first clock frequency such as 250 MegaHertz (MHz). A second part of the system is an interface such as fiber channel interface 20. Fiber channel interface 20 allows the server 12 to communicate with an external fiber channel device 22, which may be a high performance data storage device 22. The fiber channel interface 20 may itself include a serial/parallel converter 24 and other circuits, including clock circuitry 28 that generates a 106 MHz clock signal (clkB) 28.

The present disclosure describes a clock domain crossing circuit 30 that receives the clock signal (clkA) 18 from a first clock domain, domain A (e.g., the CPU), and the clock signal (clkB) from a second clock domain, domain B (e.g., the fiber channel interface), and generates enable signals (enA) and (enB) that can be used to control data transfer between the two clock domains A and B.

In operation, parallel data may for example be clocked in the first domain by clkA 18 and conveyed as a parallel data word from I/O bus 16 to interface 24. Interface 24 operates in a second clock domain by clkB and converts the parallel data to serial data to be passed further to the fiber channel device 22.

Figure 2:
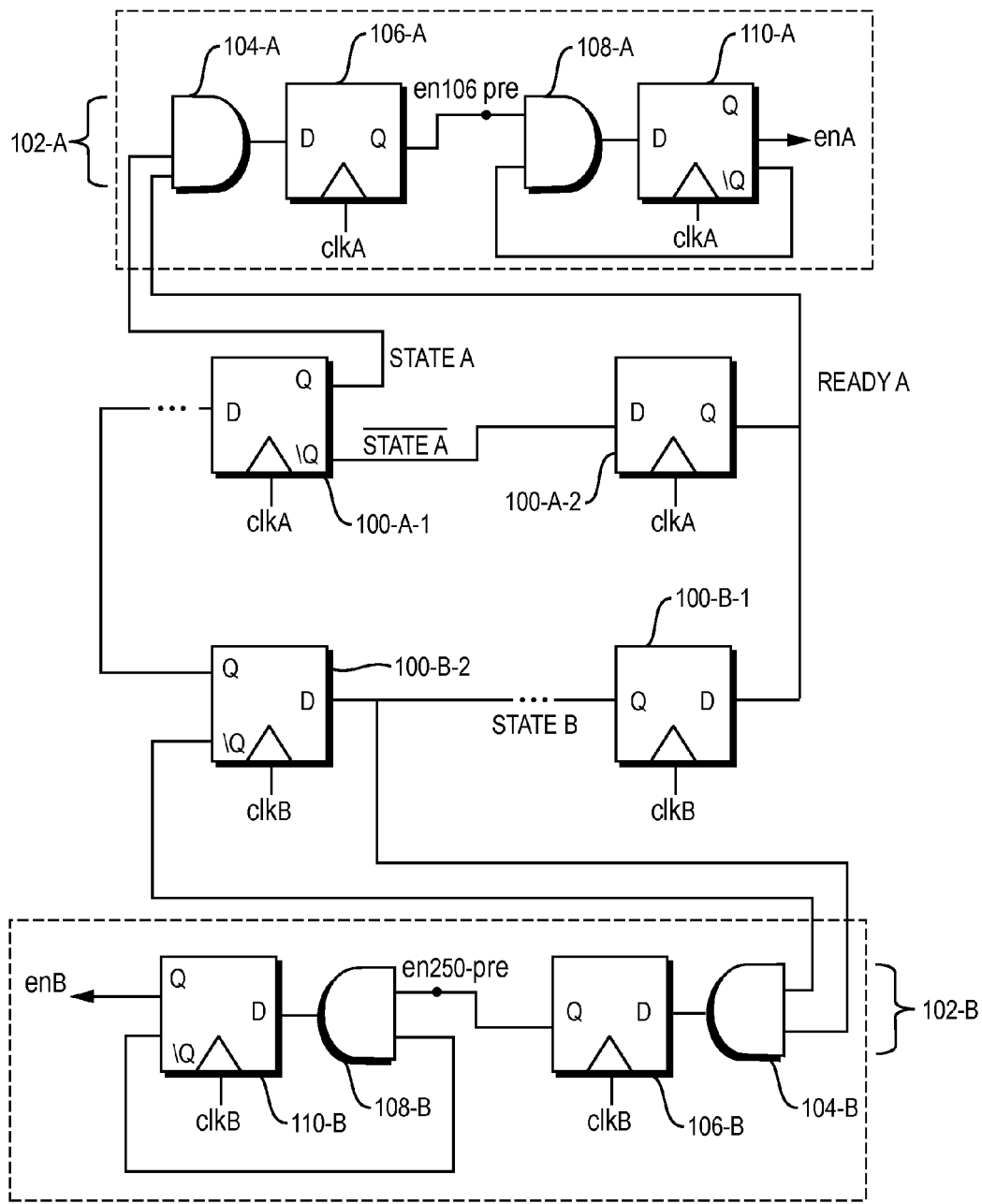
FIG. 2 illustrates a clock domain crossing circuit.

FIG. 2 shows the clock domain crossing circuit 30 in more detail. In some embodiments, there may be at least four bit storage devices implemented as D-type flip flops 100-*a*-1, 100-*a*-2, . . . , 100-*b*-1, . . . 100-*b*-2. Also included within the clock domain crossing circuit are two output circuits 102-*a*, 102-*b*. The flip flops 100 are connected to one another and arranged in a circular buffer or chain. A first subset of the flips flops, those designated by reference numbers 100-*a*-1, 100-*a*-2, . . . are clocked in domain A and clocked by clkA. Another subset of the D-flip flops 100-*b*-1, 100-*b*-2, . . . are clocked in domain B by clkB.

The circular chain of flip flops 100 is used to circulate one or more logic pulses that are then used to generate the corresponding enable signals enA, enB for the two asynchronous clock domains. In some embodiments, the single circulating pulse can be generated at system synchronization time such by having one of the flip flops in the chain feed its inverted output to the data input of its next corresponding flip flop in the chain. In some embodiments, the pulse is registered by a minimum of two flip flops 100-*a*-1, 100-*a*-2 in clock domain A before being passed to the domain B section of the circular buffer, where it is then registered by at least two flip flops 100-*b*-1, 100-*b*-2, in the domain B section. The pulse then circulates back to the domain A section of the circular buffer and again registers there with the process thus repeating indefinitely.

Inverting one of the outputs of the flip flops 100, it is guaranteed that while the circuit 30 is being clocked by both clock domains, the pulse will continue inverting itself as it passes around the circular buffer.

Selected outputs of the flip flops 100 are then used to create enable signals for registering data in each clock domain. In some embodiments, one such signal is generated by an output circuit 102-*a* using an AND gate 104-*a* and flip flop 106-*a*. The AND gate 104-*a* and a flip flop 106-*a* detect a rising edge of the circulating pulse. The output of flip flop 106-*a* is then fed to another flip flop 110-*a* through another AND gate 108-*a*. The AND gate 108-*a* and flip flop 110-*a* ensure a clean signal transition such that the enable signal enA for the associated clock domain A is only asserted for exactly one clock cycle for each round trip of the circulating pulse. The resulting output enA is then used by the other circuits in clock domain A (such as CPU 14) for transferring data to clock domain B circuits (such as the fiber channel interface 20), or to latch data from domain B into domain A.

The AND gate 104-a, ensure that at least two of the outputs 100-a-1 and 100-a-2 in domain A are at the same stable logic value before the corresponding enA signal will be asserted. This further guarantees that any input to the flip flop 106-a has been stable for at least two clock cycles.

The second AND gate 108-a and flip flop 110-a in the output circuit 102-a guarantees that the enable signal will clear on the next successive clock cycle in its corresponding domain. Thus, for example, the enA signal is asserted for only one clock cycle of its corresponding clock A, and enB signal is asserted for only one clock cycle of its corresponding clock signal clkB.

A similar output circuit 102b for the domain B side includes AND gate 104-b, flip flop 106-b and AND gate 108-b and flip flop 110-b. This circuit generates the enable signal enB which can be used to transfer data from domain B to domain A, or to latch data from domain A into domain B.

In some embodiments, the enable signals enA and enB are used in such a way that the corresponding source clock domain is only allowed to update its data registers when its corresponding enable signal is asserted. As such, the destination domain will then only sample the data at an appropriate time, when its corresponding enable signal is asserted. In this way it can be assured that there is no possibility of data corruption from a metastable condition.

For better metastability protection it is possible to insert additional flip flops in in the circuit of FIG. 2, with the small penalty being provided in speed and complexity.

Figure 3:
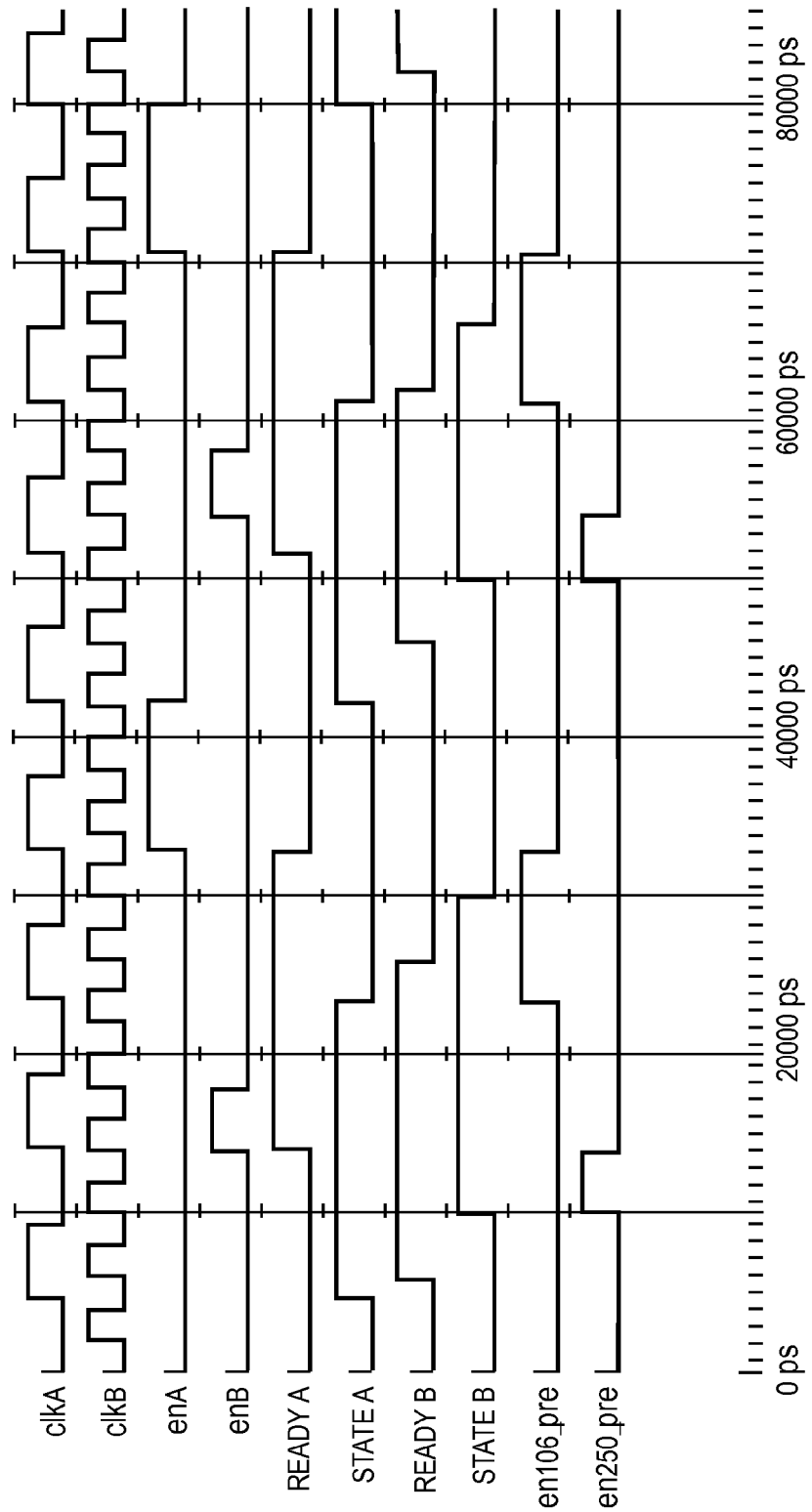
FIG. 3 is a timing diagram for the circuit of FIG. 2.

FIG. 3 is a timing diagram for certain signals of the circuit of FIG. 2. The top two traces are example input clock signals clkA 18 and clkB 28. The corresponding enable outputs enA and enB are shown on the next two lines.

These next four traces in the timing diagram are the outputs of the four flip flops shown in FIG. 2. The stateA signal is the output of flip flop 100-a-1 and stateB signal is the output of flip flop 100-b-1. The readyA signal is provided at the output of flip flop 108-a-2 and signal readyB is provided at the output of flip flop 108-b-2.

The final two traces show pre-enable signals for the corresponding domains A and B that are generated at the output of the flip flops 106-a, 106-b. From these diagrams it can be seen that the stateA signal and the stateB signal are toggled in synchronism with their corresponding clkA or clkB signals. The corresponding readyA or readyB signal is then asserted only on the rising edge of the corresponding output clock. So for example, while the stateA state signal toggles on a rising edge of clkA, the corresponding readyA signal toggles only on the rising edge of clkB.

FIG. 2 shows a slight difference in the arrangement of the signals fed from the respective domain A or domain B portion of the circular flip flop chain to the corresponding output circuit 102-a or 102-b. In particular, the stateA signal is taken from the positive output of flip flop 100-a-1, whereas the stateB signal is taken from the inverted output of flip flop 100-b-2. This may be done to ensure that the edges of the respective enable signals enA, enB are more or less centered with respect to one another, as a design decision dictated by the respective 250 MHz and 106 MHz clock frequencies. In some embodiments implemented with other clock frequencies, this may not be desired.

In some embodiments, it may be necessary and/or desirable to insert delay elements to further position the enable signals en-A, en-B with respect to one another.

In some situations, as alluded to above, it may be desirable to include fewer than two or more than two flip flops in each section of the circular chain. The exact number of flip flops depends on the relative frequencies of the two clock domains. In the example shown, with clocks of 250 MHz and 160 MHz, the four flip flops provide adequate performance. However, any arbitrary difference in frequency or phase between the different clock domains may be accommodated by to inserting additional flip flops or delays in the either the domain A section or domain B section of the circular chain. The addition of delay elements may also depend on the actual settling time of the flip flops and the differences in frequencies.

It is also evident that other configurations can provide an equivalent result. For example, other types of bit storage devices may be used instead of the D flip flops shown in FIG. 2. These may include JK flip flops, RS flip flops, latches, shift register stages, charge pipelines and so forth. The bit storage devices may be arranged such that they can store a data bit which can be clocked to a next stage in a circular buffer of storage devices.

While the circuit shown in FIG. 2 maps between two clock domains, it can now be appreciated that the circular clock crossing scheme need not be so limited. The approach may be expanded indefinitely to support additional clock domains by adding more flip flop sections; with each additional section adding but a small penalty in terms of latency and complexity to support another clock domain within the pulse chain.

It is also evident that the output circuits 102-a, 102-b may have other configurations. For example, they may be implemented using a single exclusive or (XOR) logic gate and instead of the AND gate 104-a. It is also possible to eliminate second AND gate 108-a and achieve the same result. The output circuits may use a combination of logic circuits that results in a single pulse output that is stable over at least two clock output cycles.

Embodiments as shown and described herein have advantages over FIFO circuits and other clock domain crossing implementations. FIFOs are generally recognized as being fast and exhibiting low latency. However, some embodiments described herein consume as little as four clock cycles, while being relatively inexpensive and consuming far less circuit area than a FIFO.

The embodiments described herein can be particularly advantageous where control signals are passed between the clock domains, or in other situations where it is not necessary to store every state of the signal that is passed between clock domains. In such situations, it may be unnecessary to have a FIFO that samples and stores the state of the transferred signal(s) on each and every clock cycle.

The two output circuits provide metastability protection as well as ensuring that output enable signals enA and enB are each asserted for only a single cycle of their corresponding output clock. This prevents "double clocking" the signals that cross between clock domains.

While various embodiments have now been particularly shown and described, it will be understood by those skilled in the art that various changes in form and details may be made therein without departing from the scope of the invention encompassed by the appended claims.

What is claimed is:

1. An apparatus for passing a signal from a first clock domain to a second clock domain comprising:
   at least four bit storage devices connected in a circular buffer, and with an output of a selected bit storage device in the circular buffer connected to an input of a next selected bit storage device in the circular buffer and with an input of a first one of the bit storage devices connected to an output of a last one of the bit storage devices;
a first subset of the bit storage devices having a clock input connected to a signal originating from the first clock domain;
a second subset of the bit storage devices having a clock input connected to a signal originating from the second clock domain;
a first output circuit, connected to at least two outputs of the first subset of the bit storage devices, and to produce a first clock domain data enable signal; and
a second output circuit, connected to at least two outputs of the second subset of the bit storage devices, and to produce a second clock domain enable signal.

2. The apparatus of claim 1 wherein the bit storage devices include D flip flops.

3. The apparatus of claim 2 wherein an inverted output of a selected bit storage device is connected to an input of next selected bit storage device in the circular buffer.

4. The apparatus of claim 1 wherein the first output circuit further comprises:
   a first logical AND circuit having an input connected to two selected outputs of the first subset of bit storage devices; and
   a first D flip flop, with a clock input connected to the signal originating from the first clock domain, and a data input connected to an output of the first logical AND circuit.

5. The apparatus of claim 4 wherein the first output circuit further comprises:
   a second logical AND circuit having an input connected to an output of the first D flip flop; and
   a second D flip flop, having a clock input connected to the signal originating from the first clock domain, and a data input connected to an output of the second logical AND circuit, to produce the first clock domain enable signal.

6. The apparatus of claim 5 wherein the second output circuit further comprises:
   a third logical AND circuit having an input connected to two selected outputs of the second subset of bit storage devices;
   a third D flip flop, with a clock input connected to the signal originating from the second clock domain, and a data input connected to an output of the third logical AND circuit;
   a fourth logical AND circuit having an input connected to an output of the third D flip flop; and
   a fourth D flip flop, having a clock input connected to the signal originating from the second clock domain, and a data input connected to an output of the fourth logical AND circuit, to produce the second clock domain enable signal.

7. The apparatus of claim 1 wherein the first output circuit comprises:
   a logic circuit, connected to outputs of at least two of the bit storage devices, and to provide a stable output pulse that is asserted for at least two clock cycles of the signal originating from the first clock domain.

8. The apparatus of claim 1 wherein at least one selected bit storage device is connected to provide an inverted output to a next selected bit storage device in the circular buffer.

9. The apparatus of claim 1 wherein at least one of the first or second output circuits is connected to receive an inverted output of a selected one of the bit storage devices.

10. A method for clock domain crossing comprising:
feeding a pulse among a plurality of bit storage devices arranged in a circular buffer, such that the output of a selected bit storage device feeds the input of a next selected bit storage device in the circular buffer, and such that a first subset of the plurality of bit storage devices is activated by a signal originating from a first clock domain and a second subset of the plurality of bit storage devices is activated by a signal originating from a second clock domain;
the first subset of bit storage devices storing the pulse for at least two activation cycles and the second subset of bit storage devices storing the pulse for at least two activation cycles;
generating a first and second enable signal from state signals provided by the bit storage devices, each enable signal asserted in synchronism with a corresponding one of the signals originating from the first or second clock domain.

11. The method of claim 10 wherein the bit storage devices include D flip flops.

12. The method of claim 11 wherein storing the pulse for at least two activation cycles comprises:
   using the signal from the first and second clock domains as clock inputs to the D flip flips.

13. The method of claim 10 wherein feeding a pulse further comprises:
   feeding an inverted output of a selected bit storage device to an input of next selected bit storage device in the circular buffer.

14. The method of claim 10 wherein generating a first enable signal further comprises:
   first logical ANDing two selected outputs of the first subset of bit storage devices; and
   storing, in a first D flip flop having a clock input connected to the signal originating from the first clock domain, a data input connected to receive an output of the first logical ANDing.

15. The method of claim 14 wherein generating a first enable signal further comprises:
   producing the first clock domain enable signal by second logical ANDing an output of the first D flip flop with an output of a second D flip flop, the second D flip flop storing an output of the second logical ANDing.

16. The method of claim 15 wherein generating a second enable signal further comprises:
   third logical ANDing two selected outputs of the second subset of bit storage devices;
   storing, in a third D flip flop clocked by the signal originating from the second clock domain, the output of the third logical ANDing;
   producing the second clock domain enable signal by fourth logical ANDing an output of the storing in a third D flip flop with an output of a fourth D flip flop clocked by the signal originating from the second clock domain.

17. The method of claim 10 additionally comprising:
providing a stable first output enable signal by logically combining outputs of at least two of the bit storage devices.

18. The method of claim 17 wherein providing a stable first enable signal further comprises:
asserting for at least two clock cycles of the signal originating from the first clock domain.

19. The method of claim 10 additionally comprising:
feeding an inverted output of at least one selected bit storage device to a next selected bit storage device in the circular buffer.

20. The method of claim 10 wherein at least one of the first or second ANDings receives an inverted output of a selected one of the bit storage devices.

* * * * *